United States Patent Office 3,427,280
Patented Feb. 11, 1969

3,427,280
CURABLE CARBOXYL-CONTAINING OLEFIN
POLYMER COMPOSITIONS
Lawrence G. Imhof, Westfield, N.J., assignor to Union
Carbide Corporation, a corporation of New York
No Drawing. Filed July 13, 1966, Ser. No. 564,761
U.S. Cl. 260—41                                      12 Claims
Int. Cl. C08f 15/14, 1/64

ABSTRACT OF THE DISCLOSURE

Cured ethylene-acrylic acid copolymer compositions have been obtained by mixing and heating the copolymers with refined, water dispersed and open chrysotile asbestos fibers. The resultant products have enhanced physical properties when compared with the unmodified ethylene-acrylic acid copolymers.

---

This invention relates to curable carboxyl containing olefin polymer compositions and more particularly to those which can be crosslinked by heating.

In the past, users of thermoplastic polymers have found it desirable to effect their cure or crosslinking in order to enhance physical properties, such as tensile strength or tensile modulus at both ambient and elevated temperatures. Various crosslinking techniques have been employed with thermoplastic polymers such as oxidative coupling, treatment with free radical initiators, exposure to ionizing radiation, sulfur vulcanization and the like. However such techniques involve the use of expensive reagents, or techniques or both and increase the overall cost of the cured produced.

It has been found that the cure of carboxyl-containing olefin polymers can be facilely carried out by blending and heating therewith chrysotile asbestos fibers. Since many polymeric compositions contain fillers to improve physical properties and reduce cost this discovery carries with it a double benefit in that the chysotile asbestos can serve a secondary function as a filler.

Fillers in thermoplastic polymers generally have not been found to serve as crosslinking agents which makes the above-described asbestos fibers unique in this regard. The action of said asbestos on carboxyl-containing olefin polymers is also unusual and unexpected as evidenced by the fact that such well known thermoplastic olefin polymers as ethylene/vinyl acetate, polyethylene, polypropylene, ethylene propylene copolymers, ethylene/alkyl acrylates and the like are not cross-linked by said asbestos.

The crosslinking action of said asbestos is also unique in that fillers such as calcium carbonate, talc, alumina and the like do not crosslink carboxyl-containing olefin polymers and that it is reversible up to loadings of about 100 parts per hundred or resin under an applied stress. erized therewith an α,β-ethylenically unsaturated carboxyl-containing olefin polymers containing up to about 100 phr. of asbestos.

The solvent resistance of carboxyl-containing olefin polymers cured with said asbestos is also superior to other similar thermoplastic olefin polymers, such as ethylene/vinyl acetate or ethylene/ethyl acrylate coploymers, filled with an equal amount of said asbestos.

The cured products of this invention can be used as table tops, plastic tile, flooring, decorative laminates molded articles, cable jacketing, pipe and other like applications which will become readily apparent to those skilled in the art upon further reading of the specification.

Although not essential, it is preferred to employ as the carboxyl containing α-olefin polymers of this invention interpolymers of α-olefins having the general formula:

R—CH=CH$_2$ 

where R is selected from the group consisting of hydrogen and alkyl radicals having up to 10 carbon atoms, the olefin content of said interpolymer being at least 50 mole percent of the total interpolymer and interpolymerized therewith an α,β-ethylenically unsaturated carboxylic acid having one or more carboxyl groups, said unsaturated carboxylic acid constituting up to about 50 mole percent of the total interpolymer.

However, the present invention is not limited to interpolymers derived from the interpolymerization of an α-olefin and an α,β-ethylenically unsaturated carboxylic acid. The starting polymer used to make the crosslinked polymer compositions used in this invention can also be provided by oxidizing olefinic polymers, such as those described in U.S. 3,155,644 by grafting carboxylic acid containing monomers onto an olefin polymer backbone by methods well known in the graft polymerization art such as the method described in U.S. 2,970,129 which are incorporated herein by reference or by grafting monomers such as carboxylic acid derivatives, i.e., esters, anhydrides, amides, nitriles and the like onto an olefin polymer backbone followed by conversion of free carboxylic acid groups after grafting.

Also included within the purview of this invention are halogenated, carboxyl containing α-olefin polymers. The method of introducing the halogen into these polymers is not at all critical and so can be accomplished by first preparing a halogen-free interpolymer of, for example, ethylene-acrylic acid and then halogenating that interpolymer by methods well known in the art or by interpolymerizing a halogen containing vinyl monomer with an α-olefin and an unsaturated carboxylic acid. A specific example of this latter class of interpolymers is one obtained by interpolymerizing ethylene vinyl chloride and acrylic acid. Other examples include interpolymers of ethylene-vinylidene chloride-acrylic acid, ethylene-vinyl chloride-methacrylic acid, ethylene-vinylidene chloride-methacrylic acid, ethylene-vinyl bromide-acrylic acid, ethylene-vinyl bromide-methacrylic acid, ethylene-vinyl fluoride-acrylic acid, ethylene-vinyl fluoride-methacrylic acid, ethylene-vinylidene fluoride-acrylic acid, ethylene-vinylidene fluoride-methacrylic acid, ethylene-vinyl iodide-acrylic acid, propylene-vinyl chloride-acrylic acid propylene-vinyl chloride-methacrylic acid, propylene-vinylidene chloride-acrylic acid, propylene-vinylidene chloride-methacrylic acid and the like.

As indicated above, the α-olefins preferably employed in the polymers of this invention are α-olefins having the general formula:

RCH=CH$_2$ 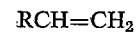

where R is either a hydrogen or an alkyl radical having up to 10 carbon atoms. Thus, suitable α-olefins include, ethylene, propylene, butene-1, pentene-1, hexane-1, neo-hexane, octene-1, nonene-1 decene-1, 3-methylbutene-1, 4-methylpentene-1, 3-methylhexene1- 4,4-dimethylhexene- 1, and the like. Although polymers of higher olefins can be used, they are not as commercially available or economical as the lower olefins.

The α,β-ethylenically unsaturated carboxylic acids used in the polymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as, methyl hydrogen maleate, methyl hydrogen fumarate, ethyl hydrogen maleate, ethyl hydrogen fumarate and the like.

The starting polymers used to make the crosslinked polymer compositions of this invention are not limited to two components. Therefore, additional copolymerizable monomers can be employed together with the olefin and carboxylic acid comonomers. The scope of the starting polymers which can be used is exemplified, although not limited by the following interpolymers: ethylene/acrylic acid interpolymers, ethylene methacrylic acid interpolymers, ethylene/itaconic acid interpolymers, ethylene/methyl hydrogen maleate interpolymers, ethylene/maleic acid interpolymers, ethylene/acrylic acid/methyl acrylate interpolymers, ethylene/acrylic acid/ethyl acrylate interpolymers, ethylene/methacrylic acid/methyl methacrylate interpolymers, ethylene/methacrylic acid/ethyl methacrylate interpolymers, ethylene/methacrylic acid/ethyl acrylate interpolymers, ethylene/methacrylic acid/methyl acrylate interpolymers, ethylene/acrylic acid/methyl methacrylate interpolymers, ethylene/methyl hydrogen maleate/ethyl acrylate interpolymers, ethylene/acrylic acid/vinyl acetate, ethylene/methacrylic acid/vinyl acetate interpolymers, ethylene/propylene/acrylic acid interpolymers, ethylene/propylene/methacrylic acid interpolymers, ethylene/maleic acid/ethyl vinyl ether interpolymers, ethylene/butene-1/acrylic acid interpolymers, ethylene/neohexene/acrylic acid interpolymers, propylene/acrylic acid interpolymers, butene-1/acrylic acid interpolymers and the like.

The weight percent of carboxyl groups present in the carboxyl-containing olefin polymers can be about 1.5 to 30 percent although it is preferred to use polymers containing about 3 to 20 percent carboxyl groups.

The melt index of carboxyl-containing olefin polymers can range from about 0.1 to 1000 dg./min. with about 1 to 400 dg./min. being the preferred range.

While not intending to be bound by any particular theory or explanation, it is believed that the curing property exhibited by said asbestos is attributable to the surface of the chrysotile asbestos which contains —Mg—OH groups and which can react with the carboxyl-containing olefin polymer to form a salt bond, i.e. a metal carboxylate link. Furthermore, the refinement of the asbestos, which results in an opening of the asbestos fiber bundles, is accompanied by an increased surface area and enhances the crosslink reaction by making more surface groups available.

The presence of a salt bond as crosslink makes this carboxyl-polymer-asbestos composition reprocessable at the lower levels of claimed asbestos loading, e.g. under about 50 or 100 phr. That is, a product can be fully or partly cured during blending or fabrication, but remolded or extruded subsequently. This adds more flexibility to this composition and yields a reprocessability feature not found in sulfur-cured rubbers or peroxide-cured polyolefins.

The refined asbestos used in this invention is obtained by the dispersion of the asbestos in water to break up the asbestos fibrous mass into small clusters of asbestos fibers and to some extent into minute individual fibers. Water-dispersion of the asbestos is preferably obtained through agitation of asbestos in water in the presence of a chemical dispersing agent, such as aluminum chloride. This dispersion technique is described in U.S. 1,907,616 and U.S. 2,661,287, for example. Additional methods of dispersing the asbestos employing chemical dispersing agents are described in U.S. 2,626,213 and U.S. 2,652,325. These small clusters and minute fibers preferably contain surface electrical charges which aid in maintaining the dispersed state. When dispersing agents such as aluminum chloride and ferric chloride are used, the water-dispersed asbestos has electropositive surface charges.

Dispersion of asbestos fibers in water will generally remove substantially all of the impurities, such as colorants, gangue and abrasive materials. This is especially true if chemical dispersing agents are employed. The presence of abrasive materials or electrical conductors, such as magnetite, in the asbestos can cause difficulty in subsequent processing steps.

The preferred asbestos for use in the present invention is chrysotile, but other forms, such as anthophyllite, crocidolite, tremolite and amosite, can also be used. The use of these other types of asbestos results in a lower degree of crosslinking. That is, melt viscosity on addition of filler to polymer is increased, but the compositions do not have the same level of high temperature (i.e., 150° C.) properties attained in the chrysotile blends. The chrysotile is further preferably obtained from asbestos deposits near Coalinga, Calif. This latter material is composed of a large proportion of short fiber asbestos which is readily dispersed into substantially individual fibers. It is conventional among most asbestos producers to classify chrysotile asbestos fibers by fiber length into short, medium and long using the Quebec Standard Test and to price them accordingly, with the short the cheapest and the long the most expensive.

An aqueous suspension of water-dispersed asbestos can be flocculated by the addition of any acid or base which will adjust the pH of the dispersed asbestos slurry to a value outside the range of about 2 to 7.5. An alternate means of flocculation is the addition of an interfering or flocculating ion, such as sulfate, nitrate or phosphate. The flocculated asbestos can be "redispersed" to a colloidal suspension, if desired, by adjusting the pH to a value within the range of about 2 to 7.5 or by removing the interfering ion. Useful flocculants are hydrochloric acid, sulfuric acid, sodium carbonate, aluminum sulfate, ammonium hydroxide, sodium hydroxide and the like. Such flocculated fibers can then be filtered and dried. This compacted form of water-dispersed asbestos can be introduced "as is" directly to molten thermoplastic carboxyl-containing olefin polymer for production of the modified polymer. Alternatively, the compacted water-dispersed asbestos can be broken up into fluffy material by mechanical means, such as a hammer mill, before introducing it into the polymer.

The water-dispersed asbestos useful in the present invention can be conveniently characterized in terms of its flocculated and dried form. Measurements are generally made on an "opened" form of the product.

In the following description of characterization tests, the asbestos fibers, before being tested, are generally opened by one pass through a laboratory size Mikro-pulverizer employing a screen with 0.046 in. slots.

Dry bulk density.—Opened asbestos fiber is loaded into a tared standard volume (12 in. x 12 in. x 12 in.) after passing the fiber through a 19 in. long fluffing column. The distance from the bottom of this column to the receiving container is 12 inches. The container is filled so that a 6-inch peak stands up above the top. This peak is carefully removed with a straight-edge and the gross weight of the container is determined. By subtracting the tare weight, the weight of asbestos is obtained directly in pounds per cubic foot. Water-dispersed asbestos useful in the process of the present invention should have a dry bulk density obtained in this manner of less than about 6 pounds per cubic foot. Preferably the dry bulk density is less than about 3 pounds per cubic foot. Non-dispersed prior art asbestos fibers generally had a dry bulk density of greater than about 6 pounds per cubic foot and generally about 7–8 pounds per cubic foot.

Wet bulk volume.—Twenty grams of opened asbestos fibers are placed in a 1-liter graduated cylinder and sufficient water is added to form 1-liter of asbestos-water slurry. The cylinder is then inverted ten times to insure uniform mixing. The cylinder is then set in an upright position and allowed to settle for three hours. At the end of this time the volume of the bulked asbestos is read in milliliters. Water-dispersed asbestos useful in the present invention should have a value greater than about 300 ml. and preferably greater than about 500 ml. Non-dispersed asbestos fiber generally has a value less than about 300 ml. and quite frequently below about 200 ml. in this test.

The sensitivity of the Wet Bulk Volume test described above can be increased by additional mechanical agitation of the asbestos-water slurry. In this version of the Wet Bulk Volume test, forty grams of opened asbestos are mixed with water to form two liters of asbestos-water slurry. This slurry is then placed in a well known pulp disintegrator and agitated and beaten for 2 min. The disintegrator is described in TAPPI (Technical Association of the Pulp and Paper Industry) Standard T–205–m–58, Appendix A. The slurry is then discharged, divided substantially in half and poured into two separate 1-liter graduated cylinders. Additional water is added to each cylinder to form 1-liter portions of asbestos-water slurries. These cylinders are then inverted and allowed to stand according to the above described procedure. Water-dispersed asbestos results in a bulked asbestos volume of greater than 900 ml. in this test while non-dispersed asbestos has wet bulk volume less than about 500 ml. in this test.

Oil adsorption.—A 5 gram sample of asbestos fibers is placed in a 500 ml. mortar. Di-octyl phthalate (DOP) is added dropwise from a graduated burette to the asbestos in the mortar. The resulting mixture is ground between the mortar and a pestle until sufficient DOP has been added to cause formation of a paste that adheres to the pestle. The end point is taken at the time when all of the asbestos-DOP mixture adheres to the pestle. Since oil adsorption data for prior art asbestos are generally based on a 10-gram asbestos sample, the measured quantity of DOP adsorbed on the 5-gram sample is multiplied by 2 to give the results in milliliters DOP/10 grams of fiber for comparison purposes. Dispersed asbestos fiber useful in the present invention should have an oil adsorption value greater than about 14 milliliters DOP/10 grams of opened fiber. Prior art non-dispersed opened asbestos fibers had an oil adsorption of about 8–10 milliliters DOP/10 grams of fiber.

Reflectance.—Three to five grams of asbestos fiber are rapidly agitated in about 300 to 500 ml. of clear water. The resulting slurry is vacuum filtered to produce a uniform filter cake. The filter cake is oven-dried at 105° C., preferably calendered, and the reflectance measured on the top and bottom surfaces of the resulting product. Reflectance is measured according to TAPPI Standard T–452–m–58 and reported as percent of ultimate reflectance based on magnesium oxide as 100 percent reflectance. Dispersed asbestos useful in the present invention should preferably have an average reflectance value based on the top and bottom readings greater than about 72 percent. The useful reflectance range is about 70 to about 80 percent. Prior art non-dispersed asbestos fiber had average reflectance values in the range of about 48 to about 72 percent.

Magnetic fraction.—This determination is made by mixing a small portion of opened asbestos fiber in water to form a thin pulp slurry and then removing magnetic material from this slurry with a magnet. The magnetic material thus obtained is then mixed with water to form a new pulp and this pulp is then cleaned of magnetic material with a magnet. The resulting material attracted to the magnet is designated as cleaned magnetics. The percent magnetic fraction is then determined as follows:

$$\frac{\text{weight of cleaned magnetics}}{\text{weight of original sample}} \times 100 = \text{percent magnetic fraction}$$

Dispersed asbestos useful in the present invention should have a magnetic fraction less than about 1.0 weight percent and preferably less than about 0.5 weight percent. Prior art non-dispersed asbestos had magnetic fractions greater than 1.0 weight percent and generally greater than 2.0 weight percent. The test for magnetic fraction can conveniently be carried out on the pulp sample employed above for measurement of wet bulk density.

An alternate method can be used to measure the magnetic fraction of the asbestos. This method involving the electromagnetic properties of asbestos is described in ASTM (American Society for Testing Materials) Standard D 1118–57. The water-dispersed asbestos useful in the present invention should have a magnetic fraction less than about 1.0 weight percent and preferably less than about 0.5 weight percent as measured by this latter technique.

The composition of the present invention can include the usual additives for thermoplastic resins such as antioxidants, pigments, colorants, opacifiers, lubricants, plasticizers, extenders and the like, without materially affecting the properties of the composition.

The range of asbestos (preferably chrysotile) used in the present invention can range from about 5 to 400 parts per hundred parts of carboxyl-containing olefin polymer although it is preferred to employ about 10 to 100 parts.

Conventional mixing equipment such as a two-roll mill, Banbury mixer, sigma mixer, Brabender Plastograph and other devices well known in the art can be used for blending the asbestos and carboxyl-containing olefin polymers used in this invention. These two components can be dry-blended or emulsions or solutions of the polymer can be used.

The preferred temperature range used to effect a curing or crosslinking of the claimed composition lies between about 150° C. and 200° C. although temperatures above and below these limits can also be used if desired.

The invention is further described in the examples which follow in which all parts and percentages are by weight unless otherwise specified.

EXAMPLE 1

One hundred parts of olefin resin identified as an ethylene-acrylic acid copolymer containing 34.0% acrylic acid copolymerized therein and having a melt index of 118 dg./min., a tensile strength of 4,200 p.s.i., an elongation of 420% and a tensile secant modulus of $3 \times 10^3$ p.s.i. (the tensile measurements being made at 23° C.) was fluxed on a 2-roll mill at 110° C. and 20 parts of refined and water dispersed chrysotile asbestos fibers were milled in immediately after fluxing. Milling time was about 5 minutes including 10 end passes to disperse the asbestos.

A 20 mil compression molded plaque was made and the plaque cured in the compression mold for about 15 minutes at about 190° C. and 750 p.s.i.g.

Specimens 2" long, ⅛" wide and 20 mils thick were cut from the plaques for tensile strength, elongation and secant modulus measurements using an Instron Tensile testing machine at 23° C. and 150° C. Secant modulus measurements were made at 1% elongation at a rate of 0.2 inch/minute. The rate was then increased to 2 inches/minute until break for tensile strength and elongation measurements.

Melt index of the products was determined according to ASTM D–1238–57T.

Flow index of the products was determined according to ASTM D-1238-57T but at 440 p.s.i.

Percent gel was determined by putting a 0.3 gram piece of the 20 mil plaques prepared as above into a 100 mesh copper wire cage which was then immersed in refluxing ethyl benzene for 16 hours. The cage was removed from the refluxing ethyl benzene and dried at 110° C. for 3 hours. The weight of resin remaining in the cage is measured as gel.

The measured properties of the cured ethylene-acrylic acid copolymer/chrysotile product are presented in Table I.

EXAMPLE 2

Example 1 was repeated except that the ethylene/acrylic acid copolymer contained 14% acrylic polymerized therein, had a melt index of 10 dg./min., a flow index of 300 dg./min., a tensile strength of 4800 p.s.i., an elongation of 750% and a secant modulus of $15 \times 10^3$ p.s.i. The properties of the cured product are contained in Table I.

EXAMPLE 3

Example 1 was repeated except that the ethylene/acrylic acid copolymer contained 10.5% acrylic acid polymerized therein, had a melt index of 10 dg./min., a flow index of 300 dg./min., a tensile strength of 4130, an elongation of 800% and a secant modulus of $10.7 \times 10^3$ p.s.i. The properties of the cured product are contained in Table I.

Control 1

Example 1 was repeated except that the olefin resin was an ethylene/vinyl acetate copolymer containing 28% vinyl acetate copolymerized therein, having a melt index of 15 dg./min., a tensile strength of 1940 p.s.i., an elongation of 760% and a secant modulus of $3.5 \times 10^3$ p.s.i. The properties of the product shown in Table 1 show no indication that chrysotile effected curing or crosslinking of ethylene vinyl acetate copolymer.

Control 2

Example 1 was repeated except that the olefin resin was a low density polyethylene having a melt index of 1.7 dg./min., a flow index of 118 dg./min., a tensile strength of 1920 p.s.i. The properties of the product as shown in Table I show no indication that chrysotile effected curing or crosslinking of low density polyethylene.

Control 3

Example 1 was repeated except that the olefin resin was an ethylene-ethyl acrylate copolymer containing 18% ethyl acrylate copolymerized therein and having a melt index of 6 dg./min., a flow index of 180 dg./min., a tensile strength of 2120 p.s.i., an elongation of 730 p.s.i. and a secant modulus of $6 \times 10^3$ p.s.i. The properties of the product shown in Table I do not indicate that chrysotile effected curing or crosslinking of ethylene-ethyl acrylate copolymer.

Control 4

Example 2 was repeated except that the chrysotile asbestos fibers were replaced by 20 parts of talc sold under the trademark Mistron vapor by Sierra Talc Company. The data shown in Table I indicate that talc does not effect curing or crosslinking of ethylene-acrylic acid copolymer.

Control 5

Example 1 was repeated except that calcium carbonate powder was substituted for chrysotile asbestos fibers. The data presented in Table I indicate that powdered calcium carbonate does not effect the cure or crosslinking of ethylene-acrylic acid copolymer.

EXAMPLE 4

Example 3 was repeated except that the amount of chrysotile used was increased from 20 to 100 phr. The properties delineated in Table I indicate that a cured ethylene-acrylic acid copolymer was obtained.

EXAMPLE 5

Example 2 was repeated except that the amount of chrysotile used was increased from 20 to 100 phr. The properties of the product shown in Table I indicate that a cured or crosslinked ethylene-acrylic acid copolymer was obtained.

EXAMPLE 6

Example 1 was repeated except that the amount of chrysotile used was increased from 20 to 200 phr. The properties of the resultant product presented in Table I indicate that a cured or crosslinked filled ethylene-acrylic acid copolymer having excellent tensile properties at both 23° C. and 150° C. was obtained.

Control 6

Control 4 was repeated except that the loading of talc was changed from 20 to 100 parts per hundred of resin. The data shown in Table I indicate that talc is not comparable to chrysotile for the curing or crosslinking of ethylene-acrylic acid copolymer.

Control 7

Control 5 was repeated except that the loading of calcium carbonate powder was increased from 20 to 43 parts per hundred of resin. The data shown in Table I, particularly the tensile properties at 150° C. indicate that calcium carbonate does not effectively cure or crosslink ethylene-acrylic acid copolymer.

Control 8

Control 3 was repeated except that the loading of chrysotile asbestos fibers was increased from 20 to 100 parts per hundred of resin. The product data is shown in Table I.

Control 9

Control 2 was repeated except that the loading of chrysotile asbestos fibers was increased from 25 to 150 parts per hundred of resin. The product data are shown in Table I.

Control 10

Example 1 was repeated with the exception that the olefin resin was an ethylene-vinyl acetate copolymer containing 18% vinyl acetate copolymerized therein and having a melt index of 2 dg./min., a tensile strength of 3000 p.s.i., an elongation of 760% and a tensile secant modulus of $6 \times 10^3$ p.s.i., and the loading of refined and water dispersed chrysotile asbestos fibers was increased from 20 to 50 parts per hundred of resin. The properties of the product are contained in Table I.

TABLE I

| | Resin | Filler | Loading, phr.[1] | Properties of Cured Plaque | | | | | | | |
|---|---|---|---|---|---|---|---|---|---|---|---|
| | | | | Gel, Percent | Melt Index, dg./min. | Melt Flow, dg./min. | Tensile Properties | | | | |
| | | | | | | | At 23° C. | | | At 150° C. | |
| | | | | | | | T.S.,[2] p.s.i. | Elong., Percent | Mod.,[3] p.s.i. | T.S.,[3] p.s.i. | Mod.,[3] p.s.i. |
| Example: | | | | | | | | | | | |
| 1 | A | (5) | 20 | 97 | NE[4] | | 4,700 | 255 | 29,000 | 70 | 100 |
| 2 | B | (5) | 25 | 100 | | NE[4] | 3,400 | 450 | 33,000 | | |
| 3 | C | (5) | 20 | 59 | | 0.14 | | | | 50 | 110 |
| Control 1 | D | (5) | 20 | 25 | 4.6 | | 2,150 | 750 | | | |
| Control 2 | E | (5) | 25 | 25 | 0.26 | | 1,700 | 120 | 37,000 | | |
| Control 3 | F | (5) | 20 | 21 | | 76 | 1,330 | 600 | | | |
| Control 4 | B | (6) | 20 | 34 | 0.9 | | 4,100 | 560 | 28,500 | | |
| Control: | | | | | | | | | | | |
| 5 | B | (7) | 20 | 46 | 0.12 | | 4,600 | 520 | 38,800 | | |
| 4 | C | (5) | 100 | 100 | | | 3,550 | 55 | 110,000 | 580 | 3,000 |
| 5 | B | (5) | 50 | 100 | | NE[4] | 3,100 | 310 | 62,000 | 250 | 1,100 |
| 6 | A | (5) | 200 | 100 | | | 4,500 | 1 | 490,000 | 2,000 | 31,000 |
| Control 6 | B | (6) | 100 | 68 | 0.51 | | 3,950 | 5 | 117,000 | 4 | 30 |
| Control 7 | B | (7) | 43 | 50 | 3.3 | | 2,370 | 530 | 19,000 | 1 | 0 |
| Control 8 | F | (5) | 100 | 67 | | 6 | 1,700 | 60 | | 30 | 1,300 |
| Control 9 | E | (5) | 150 | 73 | | 0.2 | 1,800 | 20 | 93,000 | 35 | 350 |
| Control 10 | G | (5) | 50 | 26 | | | 1,200 | 160 | 23,000 | 12 | 560 |

[1] Parts per hundred of resin.  [2] Tensile strength.  [3] Secant modulus.  [4] NE=No extrusion.  [5] Refined and water dispersed chrysotile asbestos fibers.  [6] Talc sold under the trademark Mistron Vapor by Sierra Talc Co.  [7] Calcium carbonate.
NOTE.—A=Ethylene-acrylic acid copolymer (66:34); B=Ethylene-acrylic acid copolymer (86:14); C=Ethylene-acrylic acid copolymer (89.5:10.5); D=Ethylene-vinyl acetate copolymer (72:28); E=Polyethylene, low density; F=Ethylene-ethyl acrylate copolymer (82:18); G=Ethylene-vinyl acetate copolymer (82:18).

EXAMPLES 11–22

Chrysotile in three grades, viz., Carey Canadian 7RF grade, and Union Carbide's Coalinga refined (1502–P) and standard (JT–100) grades, was compared with other asbestos types, viz., amosite, anthophyllite, crocidolite, and tremolite in their relative abilities to cure or cross-link an ethylene-acrylic acid copolymer containing 15% acrylic acid copolymerized therein and having a melt index of 50 dg./min., a flow index of 990 dg./min., a tensile strength of 3830 p.s.i., an elongation of 810% and a tensile secant modulus of 9×10³ p.s.i. (the last three properties being measured at 23° C.). The procedure used in Example 1 was followed. The properties of the cured plaques are presented in Table II. The classification of asbestos fibers is described in The Encyclopedia of Chemical Technology, vol. 2, 1960, Interscience Publishers, New York, N.Y.

EXAMPLES 23–44

Example 1 was repeated except that various copolymers or terpolymers were substituted for the resin used in Example 1 and the chrysotile asbestos fiber loadings were varied. Details of the compositions and properties of the cured products are presented in Table III.

EXAMPLES 45–47

Example 1 was repeated except that plasticized resin was used at chrysotile asbestos fiber loadings of 100 phr. Details are presented in Table III.

TABLE II

| | Resin | Asbestos Type | Loading, phr. | Properties of Cured Plaques | | | | | | |
|---|---|---|---|---|---|---|---|---|---|---|
| | | | | Percent Gel | M.I. (F.I.) | Tensile Strength at 23° C. | | | Tensile Strength at 150° C. | |
| | | | | | | Str., p.s.i. | Elong., Percent | Mod., p.s.i. | Str., p.s.i. | Mod., p.s.i. |
| Example: | | | | | | | | | | |
| 11 | H | Chrysotile, Carey,[1] grade 7RF-9 | 20 | 85 | .3 | 3,800 | 270 | 79 | 7 | 20 |
| 12 | H | Chrysotile, Union Carbide,[2] refined grade | 20 | 64 | NE | 2,700 | 240 | 40 | 15 | 46 |
| 13 | H | Chrysotile, Union Carbide,[2] standard grade | 20 | 83 | .08 | 2,600 | 240 | 43 | 1 | 0 |
| 14 | H | Amosite, ACOA,[3] grade GW | 20 | 41 | 1.9 | 1,900 | 210 | 24 | (5) | (5) |
| 15 | H | Amosite, ACOA,[3] grade KM/A | 20 | 34 | 13 | 2,100 | 270 | 25 | 1 | 0 |
| 16 | H | Anthophyllite, ACOA,[3] grade AB-6B | 20 | 14 | 13 | 2,200 | 380 | 20 | (5) | (5) |
| 17 | H | Anthophyllite, Huxley,[4] grade HF-718RF | 20 | 21 | 17 | 2,000 | 335 | 15 | | |
| 18 | H | Crocidolite, ACOA,[3] H blue | 20 | 46 | 7 | 1,800 | 60 | 38 | | |
| 19 | H | Termolite, ACOA[3] | 20 | 50 | 4 | 1,900 | 45 | 27 | | |
| 20 | F | Chrysotile, Union Carbide[2] | 50 | 100 | NE | 3,100 | 310 | 62 | 250 | 1,100 |
| 21 | F | Anthophyllite, AB-6B | 50 | 49 | | 2,400 | 315 | 32 | 2 | 0 |
| 22 | F | Crocidolite ACOA, H blue | 50 | 62 | | 2,600 | 15 | 52 | 7 | 55 |

[1] Available from Carey-Canadian Mines, Ltd.  [2] Available from Union Carbide, Mining & Metals Division.  [3] Available from Asbestos Corp. of America.  [4] Available from Huxley Development Company.  [5] Melts.
NOTE.—NE=No Extrusion; M.I.=Melt Index; F.I.=Flow Index; H=Ethylene-acrylic acid copolymer (85:15); F=Ethylene-ethyl acrylate copolymer (82:18).

TABLE III

| Resin Composition | Chrysotile Loading, phr. | Gel, percent | Melt Index, dg./min. | Properties of Cured Plaques | | | | |
|---|---|---|---|---|---|---|---|---|
| | | | | Tensile Properties | | | | |
| | | | | At 23° C. | | | At 150° C. | |
| | | | | T.S.,[1] p.s.i. | Elong., percent | Mod.,[2] p.s.i. | T.S.,[1] p.s.i. | Mod.,[2] p.s.i. |

Exp. No.:

| | | | | | | | | |
|---|---|---|---|---|---|---|---|---|
| 23....... A | 5 | 74 | 56 | 4,000 | 200 | 59 | ([4]) | |
| 24....... A | 10 | 93 | 27 | 4,300 | 145 | 72 | ([4]) | |
| 25....... A | 200 | 100 | | 4,500 | 1 | 490 | 2,000 | 31 |
| 26....... J | 300 | 98 | | 3,700 | 10 | 220 | 550 | 21 |
| 27....... K | 50 | 85 | | 1,800 | 45 | 40 | 90 | 0.5 |
| 28....... K | 20 | 49 | NE[3] | 1,500 | 110 | 27 | | |
| 29....... L | 50 | 70 | | 2,100 | 30 | 51 | 135 | 1 |
| 30....... M | 50 | 88 | | 2,200 | 200 | 36 | 150 | 0.4 |
| 31....... N | 50 | 78 | NE | 3,060 | 33 | 67 | | |
| 32....... P | 50 | 99 | | 5,800 | 10 | 191 | 350 | 1.1 |
| 33....... A | 100 | 100 | | 6,400 | 15 | 239 | 710 | 7.4 |
| 34....... R | 300 | 100 | | | | | | |
| 35....... S | 50 | 86 | | 1,200 | 490 | 5 | | |
| 36....... T | 300 | 93 | | 870 | 10 | 67 | | |
| 37....... U | 20 | 59 | | 1,300 | 165 | 6 | | |
| 38....... V | 20 | 53 | NE | 2,000 | 105 | 28 | 28 | 0.1 |
| 39....... W | 100 | 92 | | 1,600 | 190 | 3 | | |
| 40....... J | 200 | 98 | | 4,408 | 10 | 200 | | |
| 41....... Y | 42.5 | 96 | | 4,800 | 10 | 156 | 90 | 0.06 |
| 42....... X | 50 | 97 | | 3,200 | 165 | 71 | 95 | 0.2 |
| 43....... Z | 50 | 85 | | 3,400 | 70 | 107 | 70 | 1.8 |
| 44....... H | 100 | 100 | | 3,500 | 60 | 75 | | |
| 45....... H+aa | 100 | 99 | | 3,000 | 70 | 30 | | |
| 46....... H+bb | 100 | | | 1,800 | 75 | 31 | 310 | 3.2 |
| 47....... H+cc | 100 | | | 1,200 | 40 | 17 | 200 | 3.4 |

H=Ethylene-acrylic acid copolymer (85:15) M.I.=50 dg./min.
J=Ethylene-acrylic acid copolymer (85:15) M.I.=100 dg./min.
K=Ethylene-acrylic acid copolymer (97.5:2.5) M.I.=2.5 dg./min.
L=Ethylene-acrylic acid copolymer (95:5) M.I.=20 dg./min.
M=Ethylene-acrylic acid copolymer (97:3) M.I.=2 dg./min.
N=Ethylene-acrylic acid copolymer (81:19) M.I.=200 dg./min.
P=Ethylene-acrylic acid copolymer (67:33) M.I.=62 dg./min.
R=Ethylene-acrylic acid copolymer (60:40) M.I.=40 dg./min.
S=Ethylene-ethyl acrylate-acrylic acid terpolymer (72:24:4).
T=Ethylene-vinyl acetate-acrylic acid terpolymer (55:37:8).
U=Ethylene-vinyl acetate-acrylic acid terpolymer (73:20:7).
V=Ethylene-vinyl acetate-acrylic acid terpolymer (90:3:7).
W=26% chlorinated ethylene acrylic acid copolymer (87/13).
X=Ethylene-acrylic acid-sodium acrylate terpolymer (79:4:17).
Y=Ethylene-acrylic acid-sodium acrylate terpolymer (63:16:21).
Z=Ethylene-acrylic acid copolymer (82:18) MI=145 dg./min.
aa=30 parts per hundred of H of liquid bisphenol A epoxy resin having an epoxide equivalent of 185-200 and a viscosity of 10,500-19,500 centipoises at 25° C.
bb=20 parts per hundred of H of trioctyl phosphate.
cc=40 parts per hundred of H of trioctyl phosphate.
[1] Tensile strength.
[2] Secant Modulus.
[3] NE=No extrusion.
[4] Melts.

EXAMPLE 48

The solvent resistance of a resin-asbestos composition cured as in Example 1 was demonstrated with an ethylene-acrylic acid copolymer containing 10.5 percent acrylic copolymerized therein and having a melt index of 10 dg./min., a flow index of 300 dg./min., a tensile strength of 4130 p.s.i., an elongation of 800% and a secant modulus of $10.7 \times 10^3$ p.s.i. (the latter three contents determined at 23° C.) and 100 phr. of refined and water dispersed chrysotile asbestos fibers.

Weighed strips 1" x ½" x 0.020" were immersed in a number of solvents for 5 days and the percent weight gain recorded. The lower the weight gain the higher the solvent resistance.

As Control 2 an ethylene ethyl acrylate copolymer containing 18% by weight of ethyl acrylate and having a melt index of 6 dg./min., a flow index of 180 dg./min., a tensile strength of 2120 p.s.i., an elongation of 730% and a secant modulus of $6 \times 10^3$ p.s.i. was also cured as in Example 1 with 180 phr. of refined and water dispersed chrysotile asbestos fibers and 1" x ½" x 0.020" strips immersed in the same solvents as Example 4 for 5 days. The comparative data are presented in Table IV.

TABLE IV

| Solvent | Percent Wt. gain of Exp. 48 | Percent Wt. gain of Control 2 |
|---|---|---|
| Toluene | 12 | 39 |
| Gasoline [1] | 11 | 34 |
| Lubricating Oil [2] | <1 | 6 |
| Acetone | 2 | 2 |
| Carbon tetrachloride | 28 | 137 |

[1] 94 octane, leaded.
[2] SAE-20 non-detergent type.

EXAMPLE 49

The abrasion resistance of cured resin-asbestos composition of Example 44 was measured on a Taber Abrader using CS-17 abrader wheel (1000 g. wt.). Weight loss in grams was taken as the index of abradability. The compositions from cured Control 6 and 8 were also subjected to the abrasion test for comparison. Results are shown in Table V.

TABLE V

| Composition | Cycles | Wt. loss, grams |
|---|---|---|
| Example 44 | 275 | 0.0033 |
| Control 6 | 275 | 0.0328 |
| Control 8 | [1] 38 | [2] 0.0038 |

[1] Test stopped when test specimen began to tear from wear.
[2] Completion of 275 cycles would have resulted in a much greater weight loss.

EXAMPLE 50

When Example 1 is repeated with the exception that the olefin resin is an ethylene-acrylic acid-vinyl acetate terpolymer (72.3/12.1/15.6) a cured product having comparable properties is obtained.

EXAMPLES 51-59

The superiority of asbestos cured ethylene/acrylic acid compositions as to stress crack resistance compared to the ethylene/acrylic acid copolymer controls is shown in Table VI.

TABLE VI

| Example No. | Resin Composition | Asbestos[1] Loading, phr. | Stress Crack Resistance, F₅₀, hrs. | Tensile Impact,[2] ft.lb./in.[3] |
|---|---|---|---|---|
| 51[3] | B | 25 | | 197 |
| 52[3] | B | 50 | >504 | 157 |
| 53[3] | F | 25 | >504 | 148 |
| 54[4] | F | 25 | >504 | 220 |
| 55[4] | B | 25 | >504 | |
| Control 12 | B | | 24 | >250 |
| Control 13 | F | | <4 | >250 |

[1] Refined and water dispersed chrysotile asbestos fibers.
[2] Tensile Impact Test, a dumbbell specimen ⅜″×2½″ is mounted in an Izod Impact tester so that a high rate of loading is applied parallel to the long direction of the specimen. Results are reported as modulus of toughness in ft. lbs./in.[3] of specimen.
[3] Samples prepared by milling at 130° C. 15 minutes, followed by compression molding of plaques at 190° C., 20 minutes.
[4] Samples milled at 160° C., 15 minutes, molded at 190° C. 20 minutes.
B = Ethylene-acrylic acid copolymer (86:14; M.I. = 10).
F = Ethylene-acrylic acid copolymer (82:18; M.I. = 200).

EXAMPLE 60

The ability of these carboxyl copolymer-asbestos compositions to be reprocessed or reworked, that is the reversibility of the salt bond between the carboxyl function and the asbestos surface, was shown by re-molding (160° C., 30 min.) plaques which had been previously mold cured (190° C., 30 min.). Measurement of tensile properties of both moldings demonstrates that the physical properties of the once cured compositions are maintained, as shown in Table VII.

TABLE VII

| Ex. No. | Resin Composition | Asbestos Type | Loading, phr. | Molding | Tensile Properties | | | | | | |
|---|---|---|---|---|---|---|---|---|---|---|---|
| | | | | | 23° C. | | | 150° C. | | | |
| | | | | | Tensile Strength, p.s.i. | Elong., percent | Modulus, p.s.i. ×10⁻³ | Tensile Strength, p.s.i. | Elong., percent | Modulus, p.s.i. ×10⁻³ | Flow Index |
| 60 | Z | Refined Chrysotile | 50 | 1X | 3,400 | 70 | 107 | 70 | 10 | 1,800 | NF |
| | | | | 2X | 3,500 | 60 | 87 | | | | |
| 61 | H | do | 20 | 1X | 2,700 | 240 | 40 | 15 | 25 | 46 | 0.9 |
| | | | | 2X | 3,200 | 300 | 43 | | | | 3.0 |
| 62 | H | Unrefined Chrysotile | 20 | 1X | 2,600 | 240 | 43 | 1 | 60 | 0 | 2 |
| | | | | 2X | 3,200 | 315 | 29 | | | | 0.6 |
| 63 | Z | Refined Chrysotile | 10 | 1X | 2,500 | 280 | 16 | | | | [1]16 |
| | | | | 2X | 2,400 | 160 | 24 | | | | [1]13 |
| 64 | Z | do | 40 | 1X | 3,050 | 85 | 64 | | | | 3.4 |
| | | | | 2X | 3,400 | 65 | 73 | | | | 4.7 |

[1] Melt index.

EXAMPLE 66

A composition comprising ethylene/acrylic acid resin H was roll-milled with 50 phr. of chrysotile asbestos (Carey grade 7RF-9) and plaques compression molded at 190° C. for 20 minutes. This molded sample was extruded in a gas-driven extrusion plastometer at 190° C. at shear rates up to 42 sec.⁻¹, using the maximum pressure (1600 p.s.i.) of this plastometer (die dimensions: length=0.315″, diameter=.0827″). The extrudate was smooth and tough, although cured at 190° C. prior to extrusion. This again demonstrates reprocessability. The following properties were obtained on the compression molded (190° C., 20 min.) plaque:

TABLE VIII

| | |
|---|---|
| Tensile strength, p.s.i. | 5,100 |
| Elongation, percent | 20 |
| Modulus, p.s.i. | 120,000 |
| Gel, percent | 90 |
| Tensile strength at 150° C., p.s.i. | 310 |
| Elongation at 150° C., percent | 50 |
| Modulus at 150° C., p.s.i. | 1,400 |

EXAMPLES 67 AND 68

Two compositions were injection molded in a one-ounce Van Dorn Injection Molding machine. A blend of ethylene/acrylic acid copolymer (resin H 50 M.I., 15% aa), with a chrysotile asbestos (Union Carbide standard grade fiber), 25 phr., and 1.0 phr. of a high molecular weight hindered polyphenol (M.P. 49–52° C.) antioxidant was prepared on a differential speed two-roll mill (180° C., 20 min.). The cured product (600 g.) was prepared and granulated in a Wiley Mill. A combined tensile bar-impact bar molding was injection molded at a pressure of 12,000 p.s.i. with a molding cycle of two minutes, with front and rear barrel temperatures of 350° and 250° F.

A second composition was a roll milled (180° C., 20 min.) blend of resin H and Carey chrysotile asbestos (grade 7RF-9), 50 phr., 1.0 phr. of a high molecular weight hindered polyphenol (M.P. 49–52° C.) antioxidant and 2 phr. TiO₂ for whitening. This composition was injection molded similarly at a pressure of 15,000 p.s.i., with front and rear barrel temperatures of 440° and 275° F. In both injection molding trials, complete mold fill-out was obtained. Molded bars were smooth and uniform. Various properties determined on these specimens are shown in Table IX.

As noted in Table IX, reasonable toughness and good strength properties are maintained in these highly filled moldings. The high gel and some low level of modulus at 150° C. verifies the crosslinked but reworkable polymer-chrysotile structure.

TABLE IX

| | Example 67 | Example 68 |
|---|---|---|
| Tensile Strength, p.s.i. | 2,200 | 4,000 |
| Elongation, percent | 110 | 20 |
| Modulus, p.s.i. | 36,000 | 100,000 |
| Tensile Impact, ft.lb./in.³ | 164 | 221 |
| Izod Impact, ft.lb./in. notch | 2.96 | 2.06 |
| Vicat Softening Point, ° C. | 67 | 88 |
| Melt Index, dg./min. | 9.9 | [1]0.2 |
| Gel, percent | 72 | 100 |
| Modulus at 150° C., p.s.i. | 170 | 700 |
| Dielectric Constant at 50 kc. | | 2.9 |
| Power Factor at 50 kc. | | 0.055 |

[1] At 440 p.s.i.

The polymer compositions containing about 10–100 parts of chrysotile fibers per hundred parts of carboxyl-containing α-olefin being reprocessable as well as crosslinked can be used in the manufacture of extrusion molded, injection molded or compression molded articles such as, for example, pipe, wire and cable covering, laminates, tiles and the like.

Although the invention has been described in its preferred forms, it is understood that the present disclosure has been made only by way of example and that numerous changes in the details may be made without departing from the spirit and scope of the invention.

What is claimed is:
1. Polymer composition capable of being cured to a crosslinked product which comprises:
   (a) carboxyl-containing α-olefin polymer containing from about 1.5 to 30%, based on the weight of polymer, of carboxyl groups said carboxyl-containing α- olefin polymer having a melt index of about 0.1–1000 dg./min.; and (b) from about 5 to 400 parts per hundred of carboxyl-containing α-olefin polymer of refined, water dispersed and opened chrysotile asbestos fibers.

2. Polymer composition claimed in claim 1 wherein the carboxyl-containing α-olefin polymer is an ethylene-acrylic acid copolymer containing from about 3 to 20% carboxyl groups and has a melt index of about 1–400 dg./min. and the amount of chrysotile asbestos fiber is from about 10–100 parts.

3. Polymer composition claimed in claim 1 wherein the carboxyl-containing α-olefin polymer is an ethylene-methacrylic acid copolymer.

4. Polymer composition claimed in claim 1 wherein the carboxyl-containing α-olefin polymer is a nethylene-acrylic acid-acrylate salt terpolymer.

5. Polymer composition claimed in claim 1 wherein the carboxyl-containing α-olefin polymer is an ethylene-acrylic acid-acrylate ester terpolymer.

6. Polymer composition claimed in claim 1 wherein the carboxyl containing α-olefin polymer is an ethylene-acrylic acid-vinyl acetate terpolymer.

7. Polymer composition claimed in claim 1 wherein the carboxyl-containing α-olefin polymer contains chlorine substituents.

8. Polymer composition claimed in claim 1 wherein the chrysotile fibers have the opened form gross properties of an average wet bulk volume greater than about 300 ml., an average dry bulk density of less than about 6 lbs./cu. ft., oil absorption greater than about 14 ml. of dioctyl phthalate/10 grams of chrysotile, an average reflectance of greater than about 72 percent and a magnetic fraction less than about 1.0 weight percent.

9. Polymer composition claimed in claim 8 containing about 10–100 parts of chrysotile fibers per hundred parts of carboxyl-containing α-olefin.

10. Structural article fabricated from the cured polymer composition claimed in claim 1.

11. Structural article fabricated from the cured polymer composition claimed in claim 8.

12. Structural article fabricated from the polymer composition claimed in claim 1 cured at a temperature of about 150–200° C.

References Cited

UNITED STATES PATENTS 3,264,272   8/1966   Rees _____ 260—78.5

OTHER REFERENCES

Kazi, Asbestos Reinforcements and Fillers, In Modern Plastics Encyclopedia 1965, September 1964, vol. 42, No. 1A, TP 986. A2 M5 1965 C. 4 pp. 517–520.

MORRIS LIEBMAN, *Primary Examiner.*

J. H. DERRINGTON, *Assistant Examiner.*

PO-1050
(5/69)

UNITED STATES PATENT OFFICE
CERTIFICATE OF CORRECTION

Patent No. 3,427,280  Dated February 11, 1969

Inventor(x) Lawrence G. Imhof

It is certified that error appears in the above-identified patent and that said Letters Patent are hereby corrected as shown below:

Column 1, lines 57-59 should read: --This latter property permits reprocessing of cured carboxyl-containing olefin polymers containing up to about 100 phr of asbestos--

SIGNED AND
SEALED

SEP 30 1969

(SEAL)
Attest:

Edward M. Fletcher, Jr.
Attesting Officer

WILLIAM E. SCHUYLER, JR.
Commissioner of Patents